(12) United States Patent
Xin et al.

(10) Patent No.: US 11,130,691 B2
(45) Date of Patent: Sep. 28, 2021

(54) ANTI-SCALING COMPOSITION FOR WATER SYSTEMS

(71) Applicant: Cabot Corporation, Boston, MA (US)

(72) Inventors: Mei Xin, North Billerica, MA (US); William K. Barron, Alpharetta, GA (US); Timothy Wruble, Alpharetta, GA (US)

(73) Assignee: Cabot Corporation, Boston, MA (US)

( * ) Notice: Subject to any disclaimer, the term of this patent is extended or adjusted under 35 U.S.C. 154(b) by 40 days.

(21) Appl. No.: 16/210,340

(22) Filed: Dec. 5, 2018

(65) Prior Publication Data

US 2019/0194045 A1 Jun. 27, 2019

Related U.S. Application Data

(60) Provisional application No. 62/609,859, filed on Dec. 22, 2017.

(51) Int. Cl.
*C02F 1/68* (2006.01)
*C02F 1/28* (2006.01)
*C01B 25/44* (2006.01)
*C01B 32/30* (2017.01)
*C01B 32/20* (2017.01)
*C01B 25/40* (2006.01)
*C01B 25/42* (2006.01)
(Continued)

(52) U.S. Cl.
CPC .............. *C02F 1/683* (2013.01); *C01B 25/40* (2013.01); *C01B 25/42* (2013.01); *C01B 25/44* (2013.01); *C01B 25/445* (2013.01); *C01B 32/20* (2017.08); *C01B 32/30* (2017.08); *C02F 1/283* (2013.01); *C08L 33/02* (2013.01); *C01P 2004/51* (2013.01); *C01P 2004/61* (2013.01); *C01P 2006/12* (2013.01); *C01P 2006/14* (2013.01); *C01P 2006/90* (2013.01); *C02F 2303/20* (2013.01); *C02F 2303/22* (2013.01)

(58) Field of Classification Search
CPC ...... C02F 1/683; C02F 1/283; C02F 2303/20; C02F 2303/22; C01B 32/30; C01B 25/44; C01B 25/445; C01B 25/42; C01B 25/40; C01B 32/20; C08L 33/02; C01P 2006/14; C01P 2006/12; C01P 2004/51; C01P 2006/90; C01P 2004/61
See application file for complete search history.

(56) References Cited

U.S. PATENT DOCUMENTS 3,469,696 A 9/1969 Petrucci et al.
3,767,592 A 10/1973 Kwok et al.
(Continued)

FOREIGN PATENT DOCUMENTS

CA 2007280 A1 7/1990

*Primary Examiner* — Taiwo Oladapo (57) ABSTRACT

Techniques are described for preparing a water filtration composition that includes activated carbon having an ash content of at least 10 wt. % and particles of a solubilizing agent. The solubilizing agent forms a water-soluble complex with cations (e.g., calcium ions). This increases the solubility of calcium ions and other scale-forming ions in water, thus suppressing scale formation on interior surfaces of water processing infrastructure. The activated carbon and the solubilizing agent are processed to have particle sizes in a same range, thus enabling the activated carbon and the solubilizing agent to be thoroughly mixed together.

19 Claims, 3 Drawing Sheets

(51) Int. Cl.
*C01B 25/445* (2006.01)
*C08L 33/02* (2006.01)

(56) References Cited

U.S. PATENT DOCUMENTS

| | | |
|---|---|---|
| 4,169,812 A | 10/1979 | Smith et al. |
| 5,368,830 A | 11/1994 | Alfano et al. |
| 5,604,185 A | 2/1997 | Hen |
| 5,672,323 A | 9/1997 | Bhat et al. |
| 6,096,197 A | 8/2000 | Hughes |
| 6,258,250 B1 | 7/2001 | Weissenbacher et al. |
| 6,267,887 B1 | 7/2001 | Hughes et al. |
| 6,328,939 B1 | 12/2001 | Amrhein |
| 6,946,077 B2 | 9/2005 | Roodman et al. |
| 7,300,586 B2 | 11/2007 | Roodman et al. |
| 7,422,759 B2 | 9/2008 | Kepner et al. |
| 7,491,682 B2 | 2/2009 | Gupta et al. |
| 7,493,955 B2 | 2/2009 | Gupta et al. |
| 8,404,038 B2 | 3/2013 | Landreth et al. |
| 8,420,033 B2 | 4/2013 | Zhang et al. |
| 8,664,168 B2 | 3/2014 | Steiner |
| 9,598,297 B2 | 3/2017 | Ikuno |
| 2006/0219641 A1* | 10/2006 | Kepner .................. A01N 59/16 210/723 |
| 2009/0069176 A1* | 3/2009 | Hernandez ............... B01J 20/20 502/401 |
| 2010/0206809 A1 | 8/2010 | Ikuno |
| 2013/0118987 A1 | 5/2013 | Vermurlen et al. |
| 2014/0014567 A1 | 1/2014 | Boodaghians et al. |
| 2014/0042075 A1 | 2/2014 | Qiu et al. |
| 2014/0208945 A1* | 7/2014 | Satterfield .............. B01D 53/06 95/108 |
| 2015/0060286 A1 | 3/2015 | Govindan et al. |
| 2016/0060147 A1 | 3/2016 | Moore et al. |
| 2016/0096746 A1* | 4/2016 | Feng ....................... C02F 1/283 |

* cited by examiner

ANTI-SCALING COMPOSITION FOR WATER SYSTEMS

CROSS REFERENCE TO RELATED APPLICATION

This application claims priority to U.S. Provisional Patent Application No. 62/609,859, filed on Dec. 22, 2017, hereby incorporated by reference.

TECHNICAL FIELD

The present disclosure relates generally to water treatment. Specifically, the present disclosure relates to anti-scaling compositions for water systems

BACKGROUND

Water processing systems, including municipal water systems, can remove organic and inorganic substances from water processed by the system. However, the presence of cations in the water can decrease the efficiency of the water processing system when substances formed from the cations adhere to internal surfaces of the system. For example, calcium ions in the water can react with carbonate anions (among other anions) to form calcium carbonate ($CaCO_3$). The calcium carbonate precipitates can adhere to interior surfaces of water processing systems. Accumulations of $CaCO_3$ precipitates (and other precipitates, all of which are colloquially referred to as "scale") within elements of the water processing system (e.g., pipes, pumps, tubes, valves, tanks, among other elements) can reduce the efficiency of the water processing system by reducing water flow rates, increasing water processing times, increasing the frequency and duration of maintenance, and combinations thereof.

SUMMARY

Example 1 is a composition comprising activated carbon including an ash content of at least 10 weight (wt.) %; and solubilizing agent particles at a concentration from 0.1 wt. % to 5.0 wt. % of the activated carbon, wherein the activated carbon and the solubilizing agent particles each have a $D_{50}$ particle size between 5 microns and 100 microns (e.g., between 10 microns and 100 microns), the solubilizing agent particles being admixed with the activated carbon. Example 2 includes the subject matter of claim 1, wherein the solubilizing agent particles comprises from 1.5 wt % to 4.5 wt % (e.g., from 1.5 wt. % to 4.25 wt. %) of the weight of the activated carbon. Example 3 includes the subject matter of either of Example 1 or Example 2, wherein the activated carbon is derived from coal (e.g., lignite coal). Example 4 includes the subject matter of any of the preceding Examples, wherein the activated carbon comprises activated carbon particles, and further wherein the activated carbon particles and the solubilizing agent particles have a $D_{50}$ between 10 and 70 microns. Example 5 includes the subject matter of any of the preceding Examples, wherein the ash content is greater than 20 wt. % of the activated carbon. Example 6 is a slurry including the subject matter of any of the preceding Examples. Example 7 includes the subject matter of Example 6, wherein the slurry is mixed in a ratio of approximately one pound of the composition of claim 1 to approximately one gallon of water. Example 8 includes the subject matter of any of the preceding Examples, wherein the solubilizing agent particles comprises at least one of pyrophosphate, polyphosphate, hexametaphosphate, and polyacrylic acid. Example 9 includes the subject matter of Example 8, wherein the pyrophosphate is tetrasodium pyrophosphate, the polyphosphate is sodium polyphosphate, and the hexametaphosphate is sodium hexametaphosphate. Example 10 includes the subject matter of any of the preceding Examples, wherein the activated carbon comprises at least one of a surface area of from 500 $m^2/g$ to 2000 $m^2/g$ and a pore volume of from 0.9 ml/g to 1.0 ml/g. Example 11 includes the subject matter of any of the preceding Examples, wherein the solubilizing agent particles form a water-soluble complex with at least one of calcium ions and crystallites comprising calcium.

Example 12 is method for making a composition for treating drinking water, the method comprising: admixing together an activated carbon having an ash content of at least 10 wt. % with a solubilizing agent at a concentration from 0.1 wt. % to 5.0 wt. % of the activated carbon to provide a composition comprising an admixture of the activated carbon and the solubilizing agent. Example 13 includes the subject matter of Example 12, wherein the activated carbon and solubilizing agent comprise particles having a $D_{50}$ between 10 and 70 microns. Example 14 includes the subject matter of either of Examples 12 or 13, wherein the activated carbon comprises activated carbon particles and the solubilizing agent comprises solubilizing agent particles, and further wherein the activated carbon particles and the solubilizing agent particles have a $D_{90}$ of less than 100 microns. Example 15 includes the subject matter of any of Examples 12-14, wherein the solubilizing agent comprises at least one of pyrophosphate, polyphosphate, hexametaphosphate, and polyacrylic acid. Example 16 includes the subject matter of any of Examples 12-15, wherein the pyrophosphate is tetrasodium pyrophosphate, the polyphosphate is sodium polyphosphate, and the hexametaphosphate is sodium hexametaphosphate.

Example 17 is a method of treating a water supply, the method comprising: forming a water-soluble complex with cations by contacting water to be treated with a composition comprising activated carbon admixed with a solubilizing agent, the carbon and the solubilizing agent having a $D_{50}$ particle size between 5 microns and 100 microns (e.g., between 10 microns and 100 microns) and the agent comprising at least one of pyrophosphate, polyphosphate, hexametaphosphate, and polyacrylic acid. Example 18 includes the subject matter of Example 17, wherein the activated carbon and solubilizing agent are added to the water as a homogeneous mixture. Example 19 includes the subject matter of either of Examples 17 or 18, wherein a weight ratio of solubilizing agent to activated carbon is between 1:200 and 1:10. Example 20 includes the subject matter of any of Examples 17-19, wherein forming comprises adding the composition to water in a ratio of one pound of the composition to one gallon of water to form a slurry. Example 21 includes the subject matter of any of Examples 17-20, further comprising filtering the activated carbon from the water supply. Example 22 includes the subject matter of any of Examples 17-21, further comprising: placing the composition in a water-permeable container; and allowing water of the water supply to pass through the composition in the water-permeable container. Example 23 includes the subject matter of any of Examples 17-22, wherein the cation is a calcium cation. Example 24 includes the subject matter of any of Examples 17-23, wherein an anion of the solubilizing agent forms the water-soluble complex with at least one of the cations and crystallites comprising the cations.

Example 25 is a composition comprising activated carbon; and particles of a solubilizing agent at a concentration from 0.1 wt. % to 5.0 wt. % of the activated carbon, wherein the activated carbon and the solubilizing agent particles are admixed together. Example 26 includes the subject matter of Example 25, wherein the activated carbon includes an ash content of at least 10 weight (wt.) %. Example 27 includes the subject matter of either of Examples 25 or 26, wherein the agent is a solubilizing agent. Example 28 includes the subject matter of any of Examples 25-27, wherein at least one of the activated carbon and the agent has a $D_{50}$ particle size between 5 microns and 100 microns (e.g., between 10 microns and 100 microns). Example 29 includes the subject matter of any of Examples 25-28, wherein the agent particles are uniformly admixed with the activated carbon. Example 30 includes the subject matter of any of Examples 25-29, wherein the concentration of the agent comprises from 1.5 wt % to 4.5 wt % (e.g., from 1.5 wt. % to 4.25 wt. %) of the weight of the activated carbon. Example 31 includes the subject matter of any of Examples 25-30, wherein the activated carbon is derived from lignite coal. Example 32 includes the subject matter of any of Examples 25-31, wherein the activated carbon comprises activated carbon particles and further wherein the activated carbon particles and the particles of the agent have a $D_{50}$ between 10 and 70 microns. Example 33 includes the subject matter of any of Examples 25-32, wherein an ash content of the activated carbon is greater than 20 wt. % of the activated carbon. Example 34 is a slurry comprising the subject matter of any of Examples 25-33 and water. Example 35 includes the subject matter of Example 34, wherein the slurry is mixed in a ratio of approximately one pound of the composition of claim 1 to approximately one gallon of water. Example 36 includes the subject matter of any of Examples 25-35, wherein the agent comprises at least one of pyrophosphate, polyphosphate, hexametaphosphate, and polyacrylic acid. Example 37 includes the subject matter of Example 36, wherein the pyrophosphate is tetrasodium pyrophosphate, the polyphosphate is sodium polyphosphate, and the hexametaphosphate is sodium hexametaphosphate. Example 38 includes the subject matter of any of Examples 25-37, wherein the activated carbon comprises at least one of a surface area of from 500 m²/g to 2000 m²/g and a pore volume of from 0.9 ml/g to 1.0 ml/g. Example 39 includes the subject matter of any of Examples 25-38, wherein the agent forms a water-soluble complex with at least one of cations ions and crystallites.

Example 40 is a method for making a composition for treating drinking water, the method comprising: admixing together an activated carbon having with an agent at a concentration from 0.1 wt. % to 5.0 wt. % of the activated carbon to provide a composition comprising an admixture of the activated carbon and the agent. Example 41 includes the subject matter of Example 40, wherein the activated carbon comprises an ash content of at least 10 wt. %. Example 42 includes the subject matter of either of Examples 40 or 41, wherein the agent is a solubilizing agent. Example 43 includes the subject matter of any of Examples 40-42, wherein the activated carbon and the agent are particles having a $D_{50}$ between 10 and 70 microns. Example 44 includes the subject matter of any of Examples 40-43, wherein the activated carbon and the agent are particles having a $D_{90}$ of less than 100 microns. Example 45 includes the subject matter of any of Examples 40-44, wherein the agent comprises at least one of pyrophosphate, polyphosphate, hexametaphosphate, and polyacrylic acid. Example 46 includes the subject matter of any of Examples 40-45, wherein the pyrophosphate is tetrasodium pyrophosphate, the polyphosphate is sodium polyphosphate, and the hexametaphosphate is sodium hexametaphosphate.

Example 47 is a method of treating a potable water supply, the method comprising: forming a water-soluble complex with at least one of cations and crystallites comprising the cations by contacting water to be treated with a composition comprising activated carbon admixed with an agent, the agent comprising at least one of pyrophosphate, polyphosphate, hexametaphosphate, and polyacrylic acid. Example 48 includes the subject matter of Example 47, wherein the agent is a solubilizing agent. Example 49 includes the subject matter of either of Examples 47 or 48, wherein the carbon and the agent have a $D_{50}$ particle size between 5 microns and 100 microns (e.g., between 10 microns and 100 microns). Example 50 includes the subject matter of any of Examples 47-49, wherein the activated carbon and the agent are added to the water as a homogeneous mixture. Example 51 includes the subject matter of any of Examples 47-50, wherein a weight ratio of the agent to activated carbon is between 1:200 and 1:10. Example 52 includes the subject matter of any of Examples 47-51, wherein the forming comprises adding the composition to water in a ratio of approximately one pound of the composition to approximately one gallon of water to form a slurry. Example 53 includes the subject matter of any of Examples 47-52, further comprising filtering the activated carbon from the water supply. Example 54 includes the subject matter of any of Examples 47-53, further comprising: placing the composition in a water-permeable container; and allowing water of the potable water supply to pass through the composition in the water-permeable container. Example 55 includes the subject matter of any of Examples 47-54, wherein the cation is a calcium cation. Example 56 includes the subject matter of any of Examples 47-55, wherein an anion corresponding to the agent forms the water-soluble complex with at least one of the cations and the crystallites.

The figures depict various embodiments of the present disclosure for purposes of illustration only. Numerous variations, configurations, and other embodiments will be apparent from the following detailed discussion. Furthermore, as will be appreciated, the figures are not necessarily drawn to scale or intended to limit the described embodiments to the specific configurations shown. For instance, while some figures generally indicate straight lines, right angles, and smooth surfaces, an actual implementation of the disclosed techniques may have less than perfect straight lines and right angles, and some features may have surface topography or otherwise be non-smooth, given real-world limitations of fabrication processes. In short, the figures are provided merely to show example structures.

DETAILED DESCRIPTION

Overview

Activated carbon is a useful component in water filtration systems including municipal water filtration systems. When used for water filtration, activated carbon can remove a variety of substances sought to be excluded from potable water. These substances include biological, organic, and metallic contaminants, among others.

Activated carbon can be made from any of a variety of carbon source materials. These source materials include, but are not limited to, lignite coal ("lignite"), brown coal, sub-bituminous coal, bituminous coal, nut shells (e.g., walnut, almond), coconut shells, and wood. In some cases, the source material affects the efficiency with which the resulting activated carbon removes some substances from water. For example, activated carbon produced from lignite can be a desirable filter material for municipal water systems because lignite-derived activated carbon can remove many different types of contaminants (e.g., both metallic contaminants and organic contaminants) more efficiently than activated carbon derived from other carbon sources, which can be more selective in the types of contaminants that they remove.

Lignite-derived activated carbon, however, can have a high ash content (e.g., greater than 10 weight (wt.) % or greater than 20 wt. %). This high ash content can complicate the use of lignite-derived activated carbon as a water system filtration component. Minerals present in lignite, including calcium and magnesium, can readily diffuse from the activated carbon and dissolve into the water being filtered. The addition of these ions can increase the rate of build-up of scale within the elements of the water processing system. Scale accumulation within the water processing system is problematic for at least the reasons described above. Thus, using lignite-derived activated carbon can be challenging, despite its desirable property of efficiently removing multiple different contaminants, including metallic and organic substances.

In accordance with some embodiments of the present disclosure, techniques are described for preparing a composition that includes activated carbon that is mixed with particles of a solubilizing agent. In some examples, the activated carbon has a Brunauer-Emmett-Teller (BET) specific surface area of at least 500 meters (m)$^2$/gram (g) (or from 500 m$^2$/g to 2000 m$^2$/g) and a total pore volume of 0.5 milliliters (ml)/g to 1.5 ml/g. In some examples, the activated carbon can have an ash content of at least 10 wt. % or at least 20 wt. %. In some examples, the solubilizing agent forms a water-soluble complex with cations (e.g., calcium ($Ca^{2+}$) and magnesium ($Mg^{2+}$)) to prevent the cations from nucleating into crystals. In some examples, the solubilizing agent forms a complex with crystallites of scale material to prevent the crystallites from growing and/or adhering to surfaces within the water processing system. In some examples, the solubilizing agent (or mixture of agents) can employ one or more mechanisms to reduce scale formation. Regardless of the mechanism, embodiments of the present disclosure reduce scale formation relative to water treatments that lack the solubilizing agent. Thus, scale formation that can be more prevalent in high ash (i.e. calcium) content lignite-derived activated carbon is suppressed, while preserving the desirable qualities of lignite-derived activated carbon (e.g., efficient removal of metallic, organic, and other contaminants from water). In some examples, the activated carbon and the solubilizing agent are processed to have particle sizes in a same range (as measured by $D_{50}$ and/or $D_{90}$). Similar particle sizes can facilitate formation of a uniform admixture of the activated carbon and the solubilizing agent.

Scale Formation and Suppression

Figure 1:
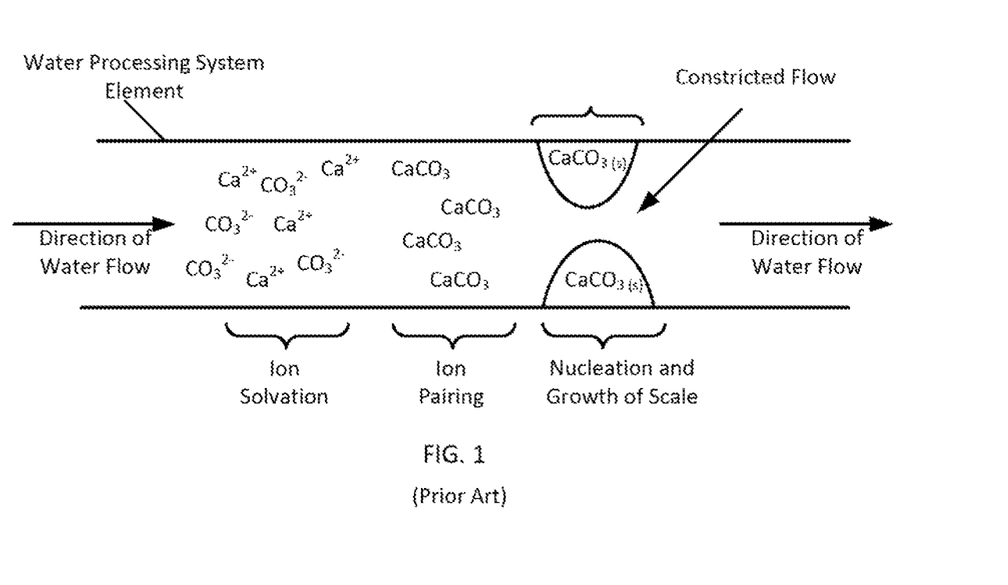
FIG. 1 is a schematic illustration of scale formation in an element of a water processing system.

The scale formation process is schematically illustrated in FIG. 1. As shown, calcium cations and carbonate anions dissolved in water can react with one another when flowing through an element of a water processing system. It will be appreciated that calcium cations and carbonate anions are shown here for convenience of illustration and that a variety of cations and anions can participate in the scale formation reaction. Regardless of the composition, the reaction product (e.g., $CaCO_3$) can accumulate on surfaces within the water processing system. As the accumulations grow, water flow is constricted. This constriction in water flow decreases the productivity and efficiency of the water processing system and can increase the frequency, expense, and inconvenience of maintenance procedures used to remove the scale. Scale accumulation in water processing systems can be more pronounced when the water being processed is more alkaline (i.e., a higher pH), or "harder" (having a higher concentration of calcium, magnesium, or other cations), or both.

Example reactions associated with scale formation (schematically illustrated in FIG. 1) are presented below in Equations 1 and 2. The reactions in Equations 1 and 2 occur when the solubility limit of one or more of the ions in water is exceeded.

$$Ca^{2+}_{(aq)} + 2HCO_3^-_{(aq)} \leftrightarrow CaCO_{3(s)} + H_2O_{(l)} \quad \text{(Equation 1)}$$

$$Ca^{2+}_{(aq)} + CO_3^{2-}_{(aq)} \leftrightarrow CaCO_{3(s)} \quad \text{(Equation 2)}$$

It will be appreciated that this reaction is only one example of a variety of reactions that can form a solid, tightly adhering scale. For example, magnesium carbonates formed from aqueous $Mg^{2+}$ ions and carbonate ions ($CO_3^{2-}$) are also a common component of solid scales. In another example, barium cations ($Ba^{2+}$) can react with sulfate anions ($SO_4^{2-}$) thereby forming barium sulfate scale. Other common scale forming cations include, but are not limited to, $Ca^{2+}$, $Mg^{2+}$, $Fe^{2+}$, $Ba^{2+}$. As indicated above, while lignite-derived activated carbon effectively removes many different types of contaminants, its ash content can contribute calcium and/or magnesium cations to water in higher concentrations than activated carbon from other sources. This can accelerate the nucleation and growth of scale.

In some cases, scale accumulation is slowed or prevented by adding acid (e.g., citric acid), which decreases pH of the water being processed. Decreasing pH increases the solubility of various ions in water. Increased solubility in turn reduces the rate at which scale precipitates out of solution and adheres to interior surfaces of the water processing system. In some cases, other substances can be added to the water (in combination with or as an alternative to acid) to suppress scale formation, such as lignin. Another technique to reduce the inconvenience associated with scale accumulations is to add various phosphate compounds to the water. Some of these phosphate compounds change the physical characteristics of the scale that is formed. Rather than a mechanically hard and tightly adhering substance (like $CaCO_3$) which is often removed using high-impact tools (e.g., jackhammers), the scale formed is a viscous substance that can be removed manually using hand tools (e.g., shovels).

To prevent scale formation when using activated carbon (such as lignite-derived activated carbon), a solubilizing agent can be added to the activated carbon. In some examples, solubilizing agents can be considered to fall into two broad categories: crystal growth modifiers and precipitation inhibitors. Solubilizing agents that are crystal growth modifiers suppress scale formation by forming complexes with scale crystallites (precipitated from solution), thus suppressing growth of the crystallites or suppressing aggregation of crystallites to one another. Solubilizing agents that are precipitation inhibitors suppress scale formation and growth by suppressing precipitation (i.e., nucleation) of scale crystallites in the first place. That is, precipitation inhibitors form water soluble complexes and/or molecules with cations that form scale (e.g., $Ca^{3+}$, $Mg^{2+}$, $Fe^{2+}$, $Ba^{2+}$). These mechanisms enable cations and/or crystallites of scale to flow through the water system so as to slow the accumulation of scale in quantities that impair the efficient operation of the water processing system.

In some examples, solubilizing agents include at least one of pyrophosphate ($P_2O_7^{4-}$), polyphosphate, polyacrylic acid ($C_3H_4O_2)_n$ (all of which are crystal growth modifiers), and hexametaphosphate ($P_6O_{18}^{6-}$) (a precipitation inhibitor). In some examples, an alkali metal salt of the agent is used. In some cases, the pyrophosphate is tetrasodium pyrophosphate ($Na_4P_2O_7$) (TSPP), the polyphosphate is sodium polyphosphate, and the hexametaphosphate is sodium hexametaphosphate ($Na_6P_6O_{18}$).

Figure 2:
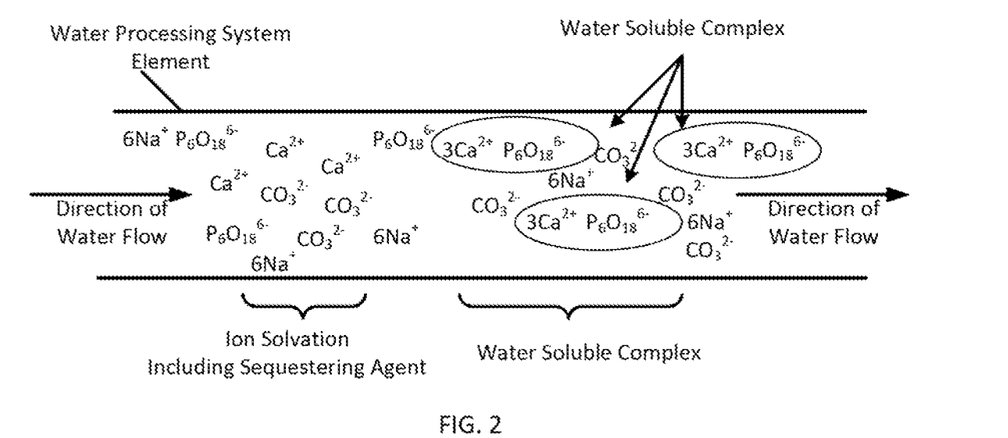
FIG. 2 is a schematic illustration of a technique for preventing scale formation using an admixture of activated carbon and a solubilizing agent that inhibits precipitation of ions into scale crystallites, in accordance with an embodiment of the present disclosure.

An illustration of an example mechanism by which the solubilizing agent reduces scale formation is schematically illustrated in FIG. 2. As shown, calcium cations, carbonate anions, and (in this example) solubilizing agent hexametaphosphate anions associated with sodium ($Na^+$) counter ions are dissolved in water that is within a water processing system. The solubilizing agent hexametaphosphate anions preferentially form a water-soluble complex with the calcium cations. This prevents the calcium cations from reacting with carbonate anions and forming scale. The solubilizing agent counter ion ($Na^+$) balances the charge with anions present in the water, including carbonate anions.

An analogous mechanism to the one schematically illustrated in FIG. 2 can occur when crystal growth modifiers are used except the solubilizing agent anions form complexes with scale crystallites (whether calcium carbonate, magnesium carbonate, or other scale material), thus suppressing crystal growth. The small crystallites thus are less likely to accumulate on water processing infrastructure and are more likely to flow through and out of the system due to their small size.

In some examples, the solubilizing agent and the activated carbon are produced to have particle sizes in a same range. Similar particle sizes can help maintain a homogenous composition of the admixture of solubilizing agent and activated carbon particles. In some cases, an admixture of different size particles might become non-homogenous after mechanical agitation due to particle size segregation. In some examples, the activated carbon and the solubilizing agent particles each have a $D_{50}$ particle size between 5 microns and 100 microns (e.g., between 10 microns and 100 microns). In some examples, the activated carbon particles and the solubilizing agent have a $D_{50}$ between 10 and 70 microns. In some examples, the activated carbon particles and the solubilizing agent particles have a $D_{90}$ of less than 100 microns. In some examples, the activated carbon particles and the solubilizing agent have a $D_{50}$ and/or a $D_{90}$ greater than 100 microns.

In some examples, the solubilizing agent is present in an admixture with activated carbon in an amount that is from 0.1 wt. % to 5.0 wt. % of the activated carbon. In some examples, the solubilizing agent is present in an admixture with activated carbon in an amount that is from 1.5 wt % to 4.5 wt % (e.g., from 1.5 wt. % to 4.25 wt. %) of the weight of the activated carbon. As indicated above, the solubilizing agent can include any one or more of pyrophosphate, polyphosphate, hexametaphosphate, and polyacrylic acid.

Method

In one example, a composition of a solubilizing agent and activated carbon (e.g., lignite-derived activated carbon that can have an ash content of at least 10 wt. % or at least 20 wt. %) described above are admixed together. In some examples, the admixture is a compositionally uniform admixture. As indicated above, this is facilitated by particles of both the solubilizing agent and the activated carbon having similar particle sizes and particle size distributions. These particle sizes are indicated above and need no further explanation. In some examples, the similar particle size and uniform admixture can be facilitated by milling the solubilizing agent and the activated carbon together. In some examples, the solubilizing agent is present at a concentration of from 0.1 wt. % to 5.0 wt. % of the activated carbon.

In some examples, a potable water supply can be treated using one or more of the compositions described above. For example, a water-soluble complex between cations in the water to be treated and anions of the solubilizing agent can be formed by contacting the water with the admixture of the activated carbon and the solubilizing agent. In one example, the composition (of the lignite-derived activated carbon and the solubilizing agent) can be added to the water as a homogenous admixture in any of the compositional ratios described above. In another example, the composition is a weight ratio of solubilizing agent to activated carbon from 1:200 to 1:10. In another example, the contacting can be performed by forming a slurry of the composition and water in a ratio described above. In another example, a slurry can be formed by adding a mixture of the solubilizing agent and activated carbon to water in a ratio of approximately one pound of mixture to approximately one gallon of water (within normal measurement tolerances). The slurry can be added to the water to be treated and the activated carbon subsequently filtered out. In another example, the composition can be placed in a water permeable container that the admixture particles cannot pass through, such as a filter. The water to be treated is then passed through the container, contacting the composition and dissolving the solubilizing agent into the water.

Experimental Results

Effectiveness of compositions described above were measured by measuring a change in electrical conductivity over time of a solution and measuring solution turbidity. Four separate samples were prepared by admixing lignite-derived activated carbon with each of (1) 2 wt. % to 6 wt. % tetrasodium pyrophosphate (SPP) (2) 2 wt. % to 6 wt. % sodium hexametaphosphate (SHMP) (3) 2 wt. % to 6 wt. % polyacrylic acid and (4) 2 wt. % to 6 wt. % citric acid. Sample 4 (citric acid) was included as a control sample for a scale suppression treatment that is not a solubilizing agent. A fifth sample (5) was untreated water used as a second control. Samples (1)-(3) were each mixed in a ratio of 1 pound of composition to 1 gallon of water for 10 minutes. The activated carbon was then filtered out. Each of the samples was then stored for 24 hours at standard temperature and pressure (from 65° F. to 75° F. and 1 atmosphere). Electrical conductivity and turbidity were measured immediately after the activated carbon was filtered out (time=0) and then again after 24 hours of storage (time=24 hours) of the sample. A higher change in conductivity (the difference between conductivity measurements at time=0 and time=24 hours) indicates ions precipitating out of solution to form scale crystallites. A lower change in conductivity after 24 hours is indicative of fewer soluble ions precipitating out of solution and is thus indicative of a lower scaling rate. Similarly, a lower turbidity after 24 hours is indicative of fewer nucleating scale molecules and is thus indicative of a lower scaling rate.

Figure 3:
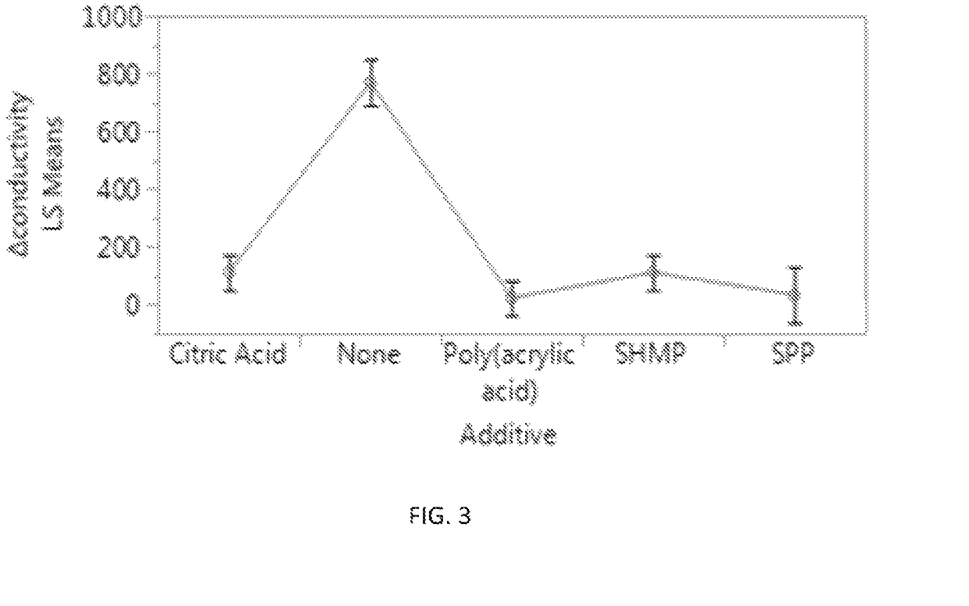
FIG. 3 depicts electrical conductivity experimental results for various compositions of lignite-derived activated carbon and solubilizing agents, in accordance with some embodiments of the present disclosure.
Figure 4:
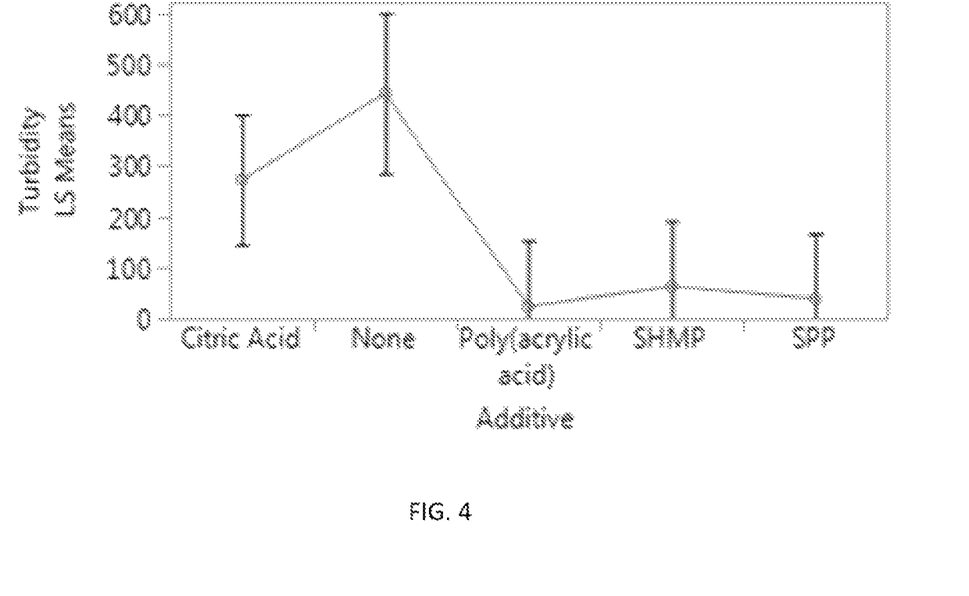
FIG. 4 depicts turbidity experimental results for various compositions of lignite-derived activated carbon and solubilizing agents, in accordance with some embodiments of the present disclosure.

FIG. 3 illustrates electrical conductivity change results for each of these five samples. FIG. 4 illustrates turbidity results for each of these five samples. As can be seen in FIG. 3, samples (1)-(4) all exhibit lower conductivity change values than the control sample (5) of untreated water. Furthermore, as can be seen in FIG. 4, samples (1)-(3) (embodiments of the present disclosure) have lower turbidity values than either citric acid (4) or the untreated water (5) samples. This indicates a reduced scaling deposition rate because fewer scale particles are nucleated in the samples (1)-(3).

Figure 5:
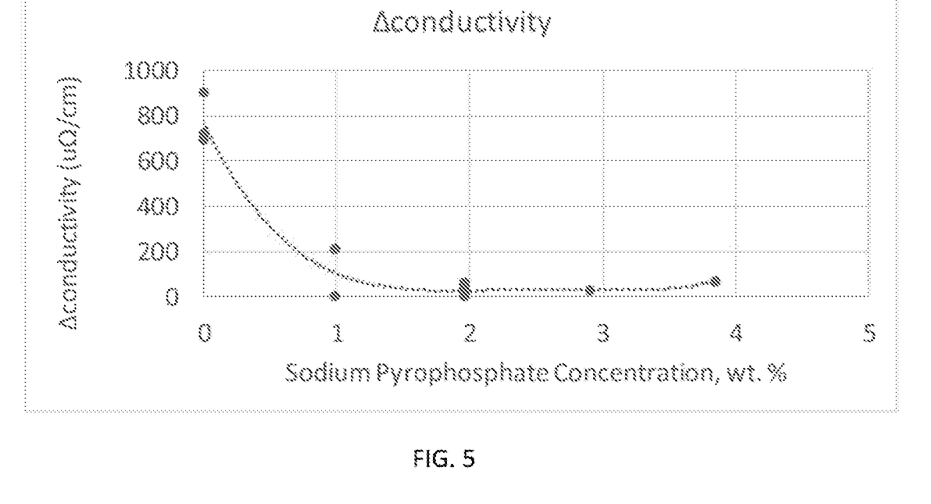
FIG. 5 depicts electrical conductivity experimental results for lignite-derived activated carbon admixed with various concentrations of a tetrasodium pyrophosphate solubilizing agent, in accordance with some embodiments of the present disclosure.
Figure 6:
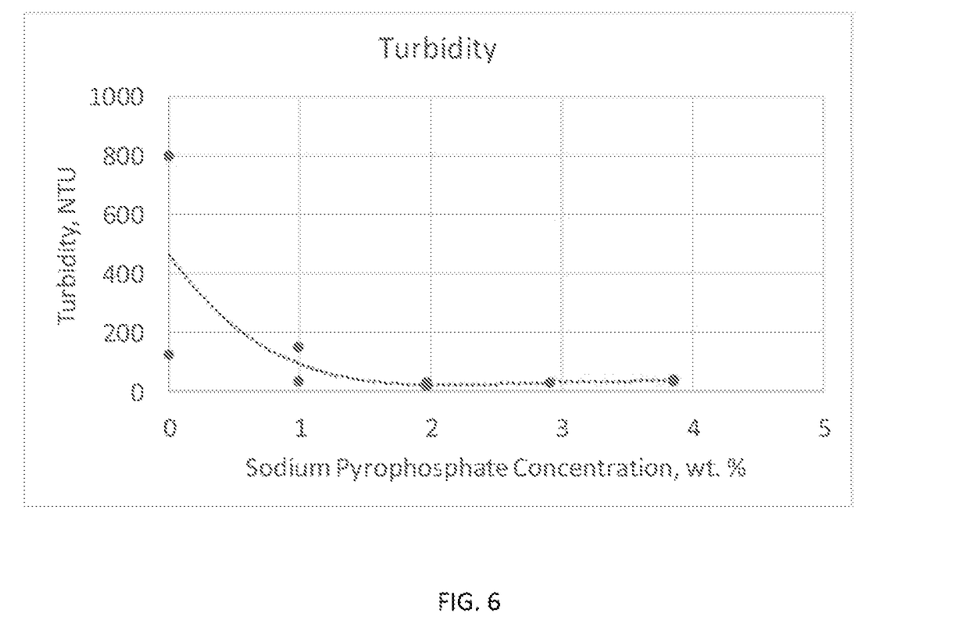
FIG. 6 depicts turbidity experimental results for lignite-derived activated carbon admixed with various concentrations of a tetrasodium pyrophosphate solubilizing agent, in accordance with some embodiments of the present disclosure.

FIGS. 5 and 6 illustrate conductivity change measurements over time and turbidity measurements for lignite-derived carbon admixed with a range of tetrasodium pyrophosphate concentrations (as measured in wt. % relative to the activated carbon). 0% SPP is a control sample. As shown, even low concentrations of tetrasodium pyrophosphate have low conductivity change values and low turbidity, thus indicating a reduced rate of scale formation due to the formation of water soluble complexes between calcium cations (among other cations) and/or scale crystallites with solubilizing agent anions.

A variety of other scale control additives that are not solubilizing agents were combined with lignite-derived activated carbon and did not reduce scaling. For example, the addition of lignin nor sodium tripolyphosphate added to lignite-derived activated carbon resulted in samples with lower conductivity, thus indicating scale formation. Nor did the addition of citric acid reduce turbidity, as shown above in FIG. 4.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A composition comprising:
   activated carbon including an ash content of at least 10 weight (wt.) %; and
   solubilizing agent particles at a concentration from 0.1 wt. % to 5.0 wt. % of the activated carbon, wherein the activated carbon and the solubilizing agent particles each have a $D_{50}$ particle size between 5 microns and 100 microns, the solubilizing agent particles being admixed with the activated carbon.

2. The composition of claim 1, wherein the solubilizing agent particles comprises from 1.5 wt. % to 4.5 wt. % of the weight of the activated carbon.

3. The composition of claim 1, wherein the activated carbon is derived from coal.

4. The composition of claim 1, wherein the activated carbon comprises activated carbon particles, and further wherein the activated carbon particles and the solubilizing agent particles have a $D_{50}$ between 10 and 70 microns.

5. The composition of claim 1, wherein the ash content is greater than 20 wt. % of the activated carbon.

6. A slurry comprising the composition of any of claims 1-5 and water.

7. The composition of claim 6, wherein the slurry is mixed in a ratio of approximately one pound of the composition of claim 1 to approximately one gallon of water.

8. The composition of claim 1, wherein the solubilizing agent particles comprises at least one of pyrophosphate, polyphosphate, hexametaphosphate, and polyacrylic acid.

9. The composition of claim 8, wherein the pyrophosphate is tetrasodium pyrophosphate, the polyphosphate is sodium polyphosphate, and the hexametaphosphate is sodium hexametaphosphate.

10. The composition of claim 1, wherein the activated carbon comprises at least one of a surface area of from 500 $m^2/g$ to 2000 $m^2/g$ and a pore volume of from 0.9 ml/g to 1.0 ml/g.

11. The composition of claim 1, wherein the solubilizing agent particles form a water-soluble complex with at least one of calcium ions and crystallites comprising calcium.

12. A method of treating a water supply, the method comprising:
   forming a water-soluble complex with cations by contacting water to be treated with a composition comprising activated carbon admixed with solubilizing agent particles, the carbon and the solubilizing agent particles having a $D_{50}$ particle size between 5 microns and 100 microns, and the solubilizing agent particles comprising at least one of pyrophosphate, polyphosphate, hexametaphosphate, and polyacrylic acid, wherein the activated carbon includes an ash content of at least 10 weight %.

13. The method of claim 12, wherein the activated carbon and solubilizing agent are added to the water as a homogeneous mixture.

14. The method of claim 13, wherein a weight ratio of the solubilizing agent particles to activated carbon is between 1:200 and 1:10.

15. The method of claim 12, wherein forming comprises adding the composition to water in a ratio of one pound of the composition to one gallon of water to form a slurry.

16. The method of claim 12, further comprising filtering the activated carbon from the water supply.

17. The method of claim 12, further comprising:
placing the composition in a water-permeable container; and
allowing water of the water supply to pass through the composition in the water-permeable container.

18. The method of claim 12, wherein the cation is a calcium cation.

19. The method of claim 12, wherein an anion of the solubilizing agent particles form the water-soluble complex with at least one of the cations and crystallites comprising the cations.

* * * * *